(12) United States Patent
Notarnicola et al.

(10) Patent No.: US 11,130,174 B2
(45) Date of Patent: Sep. 28, 2021

(54) SUPPORT STRUCTURE AND METHODS FOR ADDITIVELY MANUFACTURING IMPELLERS

(71) Applicant: General Electric Company, Schenectady, NY (US)

(72) Inventors: Michael Robert Notarnicola, Cincinnati, OH (US); Christopher Michael Bryant, Harrison, OH (US); Stephen Joseph Waymeyer, Batavia, OH (US)

(73) Assignee: General Electric Company, Schenectady, NY (US)

( * ) Notice: Subject to any disclaimer, the term of this patent is extended or adjusted under 35 U.S.C. 154(b) by 272 days.

(21) Appl. No.: 16/054,317

(22) Filed: Aug. 3, 2018

(65) Prior Publication Data
US 2020/0040739 A1 Feb. 6, 2020

(51) Int. Cl.
*B22F 5/00* (2006.01)
*F02C 3/08* (2006.01)
*B29C 64/153* (2017.01)
*B33Y 40/20* (2020.01)
(Continued)

(52) U.S. Cl.
CPC ............. *B22F 5/009* (2013.01); *B22F 10/20* (2021.01); *B29C 64/153* (2017.08); *B29C 64/40* (2017.08);
(Continued)

(58) Field of Classification Search
CPC ........ B22F 3/1055; B22F 5/009; B22F 10/20; B29C 64/40; B29C 64/153; B33Y 40/20;
(Continued)

(56) References Cited

U.S. PATENT DOCUMENTS 4,529,452 A * 7/1985 Walker .................. B21K 1/761
148/527
7,281,901 B2 * 10/2007 Garman ................ F04D 29/681
416/233
(Continued)

FOREIGN PATENT DOCUMENTS

CN 108374802 A * 8/2018
WO WO2017/096440 A1 6/2017

OTHER PUBLICATIONS

International Search Report Corresponding to Application No. PCT/US2019/044350 dated May 29, 2020.

*Primary Examiner* — Christopher S Kessler
*Assistant Examiner* — Andrew M Cheung
(74) *Attorney, Agent, or Firm* — Dority & Manning, P.A.

(57) ABSTRACT

A shrouded impeller and a method of additively manufacturing the same are provided. In one example aspect, the shrouded impeller includes a hub and a shroud spaced from the hub. The shrouded impeller also includes a plurality of vanes extending between and connecting the hub and the shroud. The vanes are spaced circumferentially apart from one another. Flow passages are defined between adjacent vanes. In some implementations, the shrouded impeller is additively manufactured. During printing, one or more support structures are formed within and fill a portion of one or more of the flow passages to support the unsupported walls of the shrouded impeller, e.g., the shroud. Further, the support structures are removable from the shrouded impeller, e.g., after the shrouded impeller has been printed.

16 Claims, 11 Drawing Sheets

(51) Int. Cl.
   *B29C 64/40*  (2017.01)
   *F01D 5/04*   (2006.01)
   *B22F 10/20*  (2021.01)
   *B33Y 10/00*  (2015.01)
   *B33Y 80/00*  (2015.01)
   *F01D 9/04*   (2006.01)

(52) U.S. Cl.
   CPC .............. *B33Y 40/20* (2020.01); *F01D 5/048* (2013.01); *F02C 3/08* (2013.01); *B33Y 10/00* (2014.12); *B33Y 80/00* (2014.12); *F01D 9/045* (2013.01); *Y02P 10/25* (2015.11)

(58) Field of Classification Search
   CPC ......... B33Y 10/00; B33Y 80/00; F01D 5/048; F01D 9/045; F02C 3/08; Y02P 10/25; F04D 29/284
   See application file for complete search history.

(56) References Cited

U.S. PATENT DOCUMENTS

| | | | |
|---|---|---|---|
| 9,114,488 B2 | 8/2015 | Rice et al. | |
| 9,714,577 B2 | 7/2017 | Kington et al. | |
| 9,810,235 B2 | 11/2017 | Giannozzi et al. | |
| 9,868,155 B2* | 1/2018 | Gerber | F04D 29/023 |
| 2015/0017013 A1* | 1/2015 | Tozzi | F04D 29/023 |
| | | | 416/227 R |
| 2016/0024966 A1 | 1/2016 | Campomanes et al. | |
| 2016/0082510 A1 | 3/2016 | Chase et al. | |
| 2017/0107821 A1* | 4/2017 | Schwarz | B23K 26/342 |
| 2017/0189966 A1 | 7/2017 | Giannozzi et al. | |
| 2018/0043610 A1 | 2/2018 | LaBossiere et al. | |
| 2018/0209276 A1* | 7/2018 | Tozzi | F01D 5/147 |
| 2018/0355883 A1* | 12/2018 | Pulnikov | B22F 3/008 |
| 2019/0210111 A1* | 7/2019 | Army | B33Y 10/00 |

* cited by examiner

SUPPORT STRUCTURE AND METHODS FOR ADDITIVELY MANUFACTURING IMPELLERS

FIELD

The present subject matter relates generally to impellers, e.g., for gas turbine engines, and more particularly to an additively manufactured shrouded impellers.

BACKGROUND

A gas turbine engine generally includes a fan and a core arranged in flow communication with one another. The core of the gas turbine engine generally includes, in serial flow order, a compressor section, a combustion section, a turbine section, and an exhaust section. In operation, air is provided from the fan to an inlet of the compressor section where one or more compressor components progressively compress the air until it reaches the combustion section. One or more axial compressors and an impeller of the compressor section may be used to compress the air. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Additively manufacturing impellers has presented certain challenges, particularly shrouded impellers. For instance, additively manufacturing impellers lying flat on a platform or bed of an additive manufacturing machine has not produced satisfactory results. That is, it has been challenging to print an impeller with its axis of rotation orthogonal to the flat surface of the bed. Printing impellers flat has been unsatisfactory in part due to unsupported portions of the shroud or roof of the shrouded impeller at the trailing edge exit of flow passages defined by vanes of the shrouded impeller. Consequently, in some conventional printing processes, the shrouded impeller is printed at an angle, e.g., forty-five degrees (45°), to overcome the unsupported shroud issue. However, printing the shrouded impeller at an angle presents another set of challenges. For instance, a support is generally needed along the underside of the shrouded impeller during printing to support unsupported portions of the shrouded impeller caused by angling the shrouded impeller. Further, angling the shrouded impeller causes the built height of the component to be taller and thus printing time and costs for producing the shrouded impeller are increased.

Accordingly, additively manufactured shrouded impellers and methods thereof that address one or more of the challenges noted above would be useful.

BRIEF DESCRIPTION

Aspects and advantages of the invention will be set forth in part in the following description, or may be obvious from the description, or may be learned through practice of the invention.

In one exemplary embodiment of the present disclosure, a method for manufacturing a shrouded impeller is provided. The method includes depositing a layer of additive material on a bed of an additive manufacturing machine. Moreover, the method includes directing energy from an energy source of the additive manufacturing machine to successively fuse one or more layers of additive material on top of the layer of additive material to form the shrouded impeller. The formed shrouded impeller includes a hub and a shroud spaced from the hub. Further, the shrouded impeller includes a plurality of vanes extending between and connecting the hub and the shroud, wherein a flow passage extending between an inlet and an outlet is defined between adjacent vanes of the plurality of vanes. Moreover, during directing, a support structure is formed within the flow passage and is removable therefrom.

In another exemplary embodiment of the present disclosure, an additively manufactured shrouded impeller. The shrouded impeller includes a hub and a shroud spaced from the hub. Further, the shrouded impeller includes a plurality of vanes extending between and connecting the hub and the shroud, wherein a flow passage extending between an inlet and an outlet is defined between adjacent vanes of the plurality of vanes. Moreover, the shrouded impeller includes a plurality of spacer vanes each extending between and connecting the hub and the shroud and positioned within the flow passage between adjacent vanes of the plurality of vanes, the plurality of spacer vanes extending from the outlet of the flow passage along at least a portion of the flow passage, and wherein sub passages are defined adjacent each of the plurality of spacer vanes.

In another exemplary embodiment of the present disclosure, a method for manufacturing a component of a turbomachine is provided. The method includes depositing a layer of additive material on a bed of an additive manufacturing machine. The method also includes directing energy from an energy source of the additive manufacturing machine to successively fuse one or more layers of additive material on top of the layer of additive material to form the component. The formed component includes a bottom wall and a top wall spaced from the bottom wall along a vertical direction. Further, the formed component includes a plurality of connecting walls extending between and connecting the bottom wall and the top wall, wherein a volume is defined between adjacent connecting walls of the plurality of connecting walls. Moreover, during directing, the component is built up from the bottom wall to the top wall along the vertical direction and a support structure is formed within the volume defined between adjacent connecting walls of the plurality of connecting walls and is removable therefrom, and wherein a preselected gap is defined between the support structure and the top wall.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
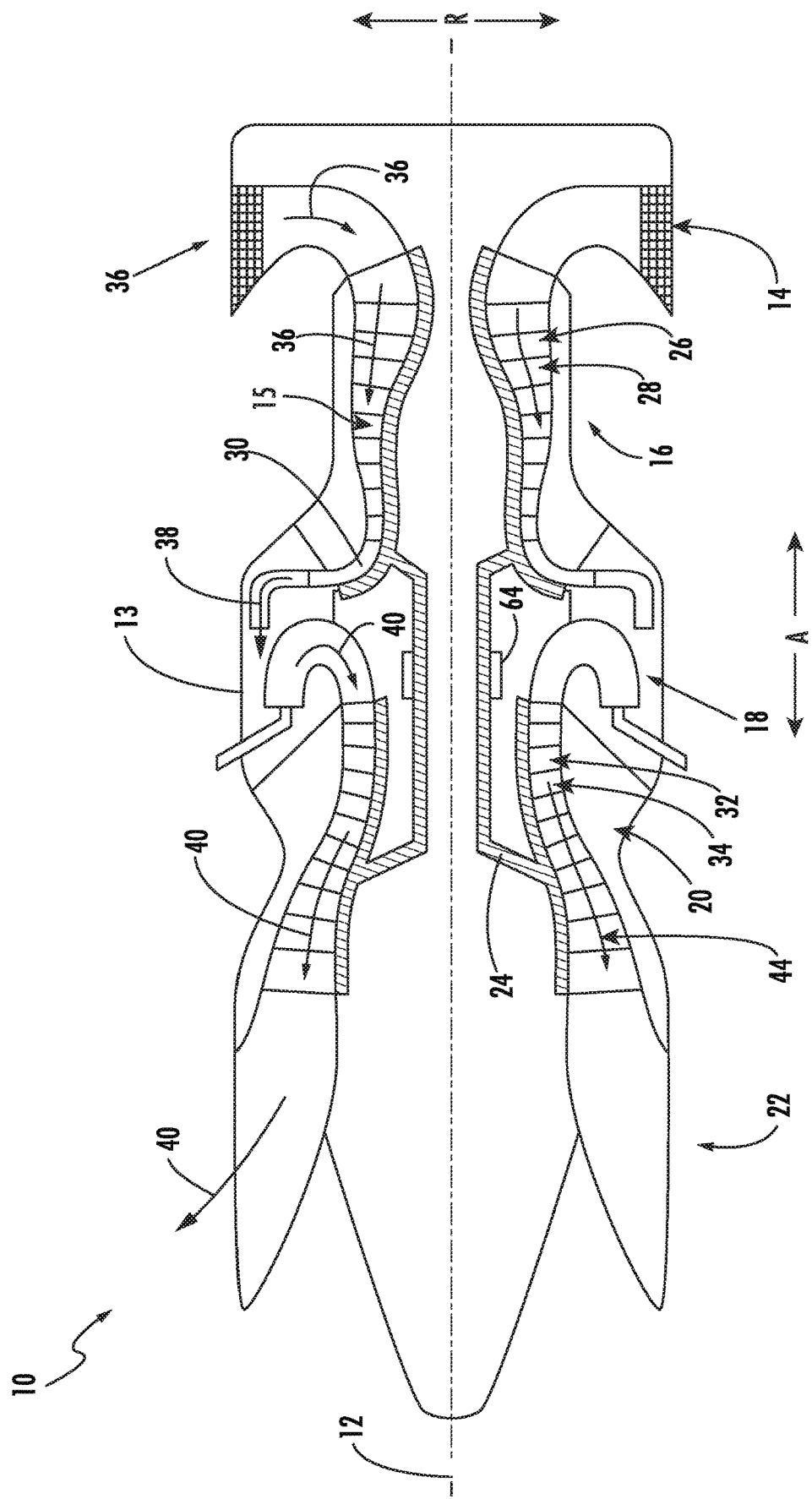
FIG. 1 provides a schematic cross-sectional view of an exemplary gas turbine engine in accordance with exemplary embodiments of the present disclosure.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, terms of approximation, such as "approximately," "substantially," or "about," refer to being within a ten percent margin of error. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

The present disclosure is generally directed to a shrouded impeller and a method of additively manufacturing the same. In one exemplary aspect, the shrouded impeller includes a hub and a shroud spaced from the hub. The shrouded impeller also includes a plurality of vanes extending between and connecting the hub and the shroud. The vanes are spaced circumferentially apart from one another. Flow passages are defined between adjacent vanes. Each flow passage extends between an inlet and an outlet. One or more spacer vanes extend between and connect the hub and the shroud within the various flow passages. In particular, the spacer vanes are positioned between adjacent vanes of the plurality of the vanes and are circumferentially spaced apart from one another and the vanes. The spacer vanes extend along at least a portion of the flow passage. Each spacer vane at least partially defines a sub passage. In some implementations of additively manufacturing the shrouded impeller, one or more support structures are formed within and fill a portion of the sub passages to support the unsupported walls of the shrouded impeller, e.g., the shroud of the shrouded impeller. Further, the support structures are removable from the shrouded impeller, e.g., after the shrouded impeller has been printed.

The shrouded impeller described below may be utilized for any number of applications and in any suitable industry. For instance, the shrouded impeller may be incorporated into any suitable turbomachine, such as e.g., a gas turbine engine as explained below. Moreover, the shrouded impeller may be incorporated into other suitable applications, including pumps, turbochargers, and other machines that include shrouded impellers.

Figure 2:
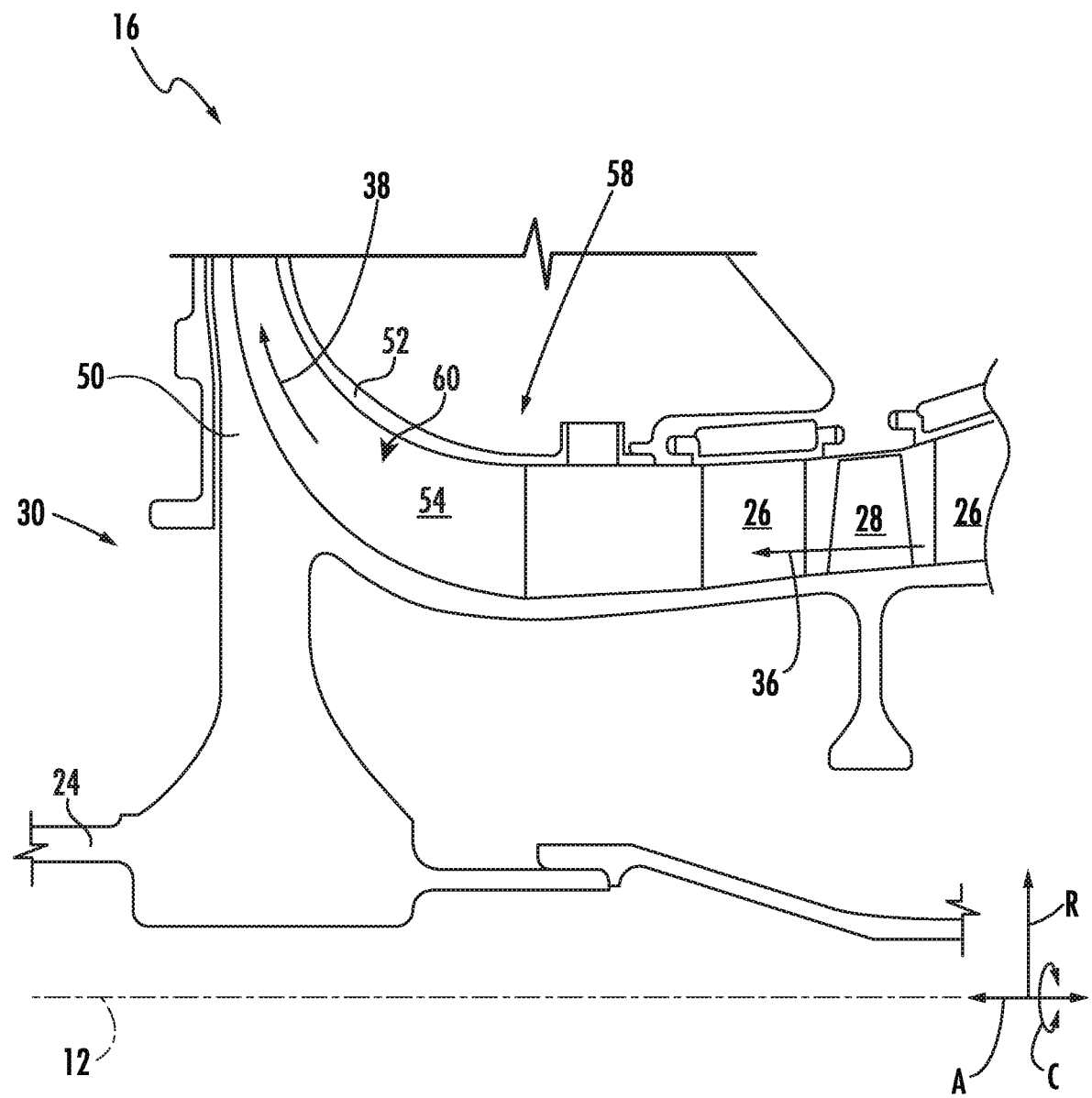
FIG. 2 provides a cross-sectional side view of a compressor section of the gas turbine engine of FIG. 1 illustrating an impeller.

FIG. 1 provides a schematic cross-sectional view of an exemplary gas turbine engine 10 as may incorporate various embodiments disclosed herein. As shown in FIG. 1, the gas turbine engine 10 defines an axial direction A, a radial direction R, and a circumferential direction C (FIG. 2). In addition, the gas turbine engine 10 defines an axial centerline or longitudinal axis 12 extending therethrough. In general, the axial direction A extends parallel to the longitudinal axis 12, the radial direction R extends orthogonally to and from the longitudinal axis 12, and the circumferential direction C extends concentrically around the longitudinal axis 12.

The gas turbine engine 10 generally includes a substantially tubular outer casing 13 that defines an annular inlet 14. The outer casing 13 may be formed from a single casing or multiple casings. The outer casing 13 encloses, in serial flow relationship, a compressor 16, a combustion section 18, a turbine 20, and an exhaust section 22. A core air flowpath 15 defined by the gas turbine engine 10 fluidly connects the compressor 16, combustion section 18, turbine 20, and the exhaust section 22. The compressor 16 includes one or more sequential stages of compressor stator vanes 26, one or more sequential stages of compressor blades 28, and an impeller 30. The turbine 20 includes one or more sequential stages of turbine stator vanes 32 and one or more sequential stages of turbine blades 34, which define a hot gas path 44. A shaft or spool 24 drivingly couples the turbine 20 and the compressor 16. The shaft 24 may be formed from a single shaft or multiple shaft segments. One or more bearings (not shown) may be positioned in one or more sumps 64 to rotatably support the shaft 24.

In alternative embodiments, the gas turbine engine 10 may include multiple compressors and/or multiple turbines. In some embodiments, for example, the gas turbine engine 10 may include a high pressure compressor coupled to a high pressure turbine by a high pressure spool and a low pressure compressor coupled to a low pressure turbine by a low pressure spool.

During operation of the gas turbine engine 10, air 36 enters the annular inlet 14 of the gas turbine engine 10. The air 36 flows into the compressor 16 where the one or more sequential stages of compressor stator vanes 26 and compressor blades 28 coupled to the shaft 24 progressively compress the air 36 flowing along the core air flowpath 15. The impeller 30 directs and further compresses the now compressed air 38 into the combustion section 18 where it mixes with fuel and burns to provide combustion gases 40. The combustion gases 40 flow through the turbine 20 where the one or more sequential stages of turbine stator vanes 32 and turbine blades 34 coupled to the shaft 24 extract kinetic and/or thermal energy therefrom. This energy extraction supports operation of the compressor 16. The combustion gases 40 exit the gas turbine engine 10 through the exhaust section 22.

Although the gas turbine engine 10 described above is a reverse flow, turbojet engine for use in an aerial vehicle, the gas turbine engine 10 may be any suitable type of gas turbine and may be used for any suitable application. For example, the gas turbine engine 10 may by a high bypass turbofan, an unducted turbofan, a turboshaft, a marine gas turbine engine, or an industrial gas turbine used for power generation.

FIG. 2 provides a close up view of a downstream portion of the compressor 16 of the gas turbine engine 10 of FIG. 1. As shown, the impeller 30 is positioned at a downstream end 58 of the compressor 16 for further compressing and directing the compressed air 38 into the combustion section 18 (FIG. 1). The impeller 30 includes a hub 50, a roof or shroud 52 spaced from the hub 50, and a plurality of blades or vanes 54 extending between and connecting the hub 50 and the shroud 52 (only one vane is shown in FIG. 2). The vanes 54 are spaced apart from one another along the circumferential direction C. The shroud 52 generally encloses the vanes 54. The vanes 54 each extend a relatively short distance along the axial direction A and transition to the radial direction R with a high radial vane twist. A plurality of flow passages 60 are defined between adjacent vanes 54 (only one flow passage 60 is shown in FIG. 2) and each form part of the core air flowpath 15 (FIG. 1). The hub 50 and shroud 52 also define each flow passage 60. FIGS. 1 and 2 provide one example application in which an impeller may be incorporated, however, the impeller 30 may be used in other suitable applications and industries as well. An exemplary shrouded impeller is provided below.

Figure 3:
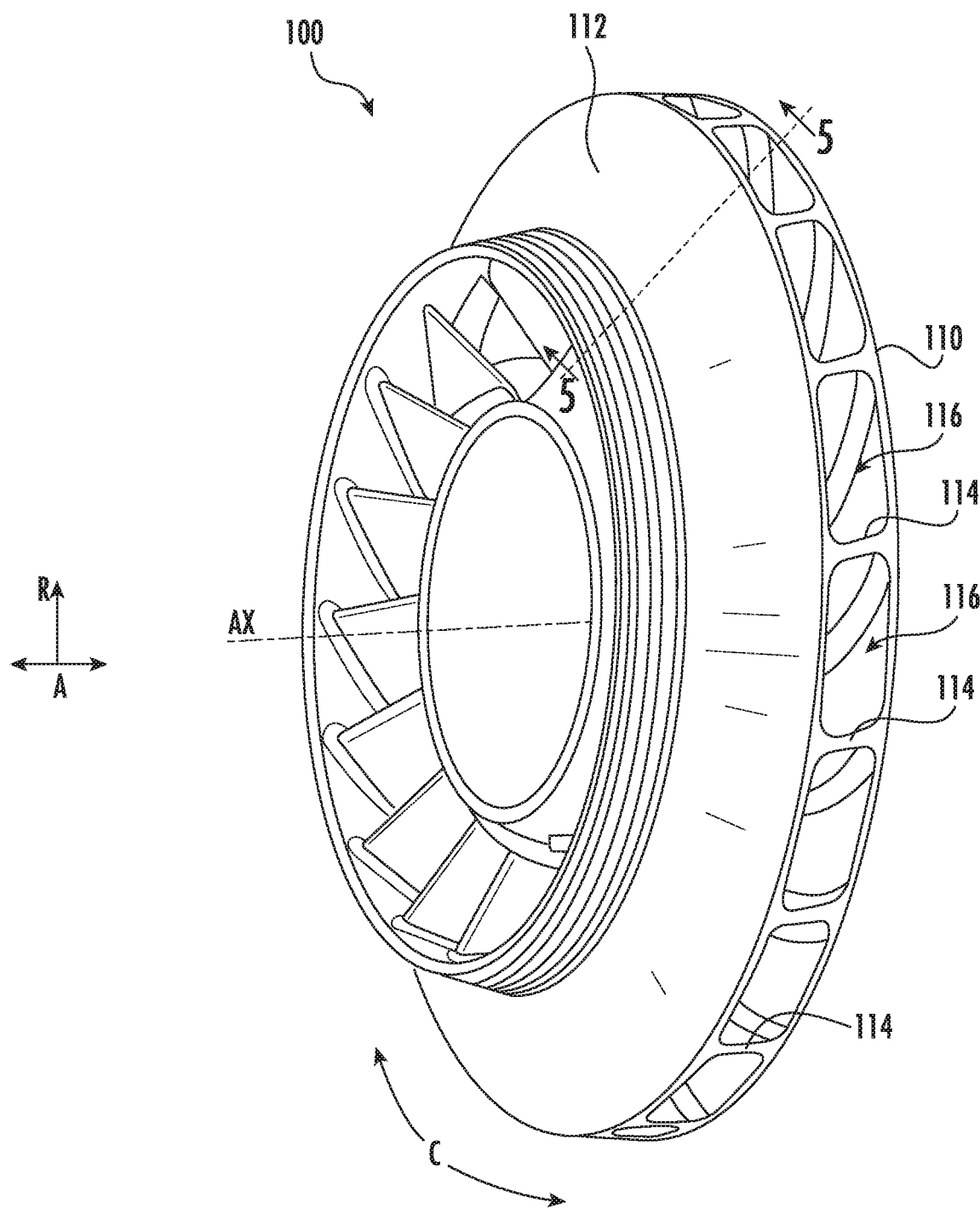
FIG. 3 provides a perspective view of an exemplary shrouded impeller in accordance with exemplary embodiments of the present disclosure.
Figure 4:
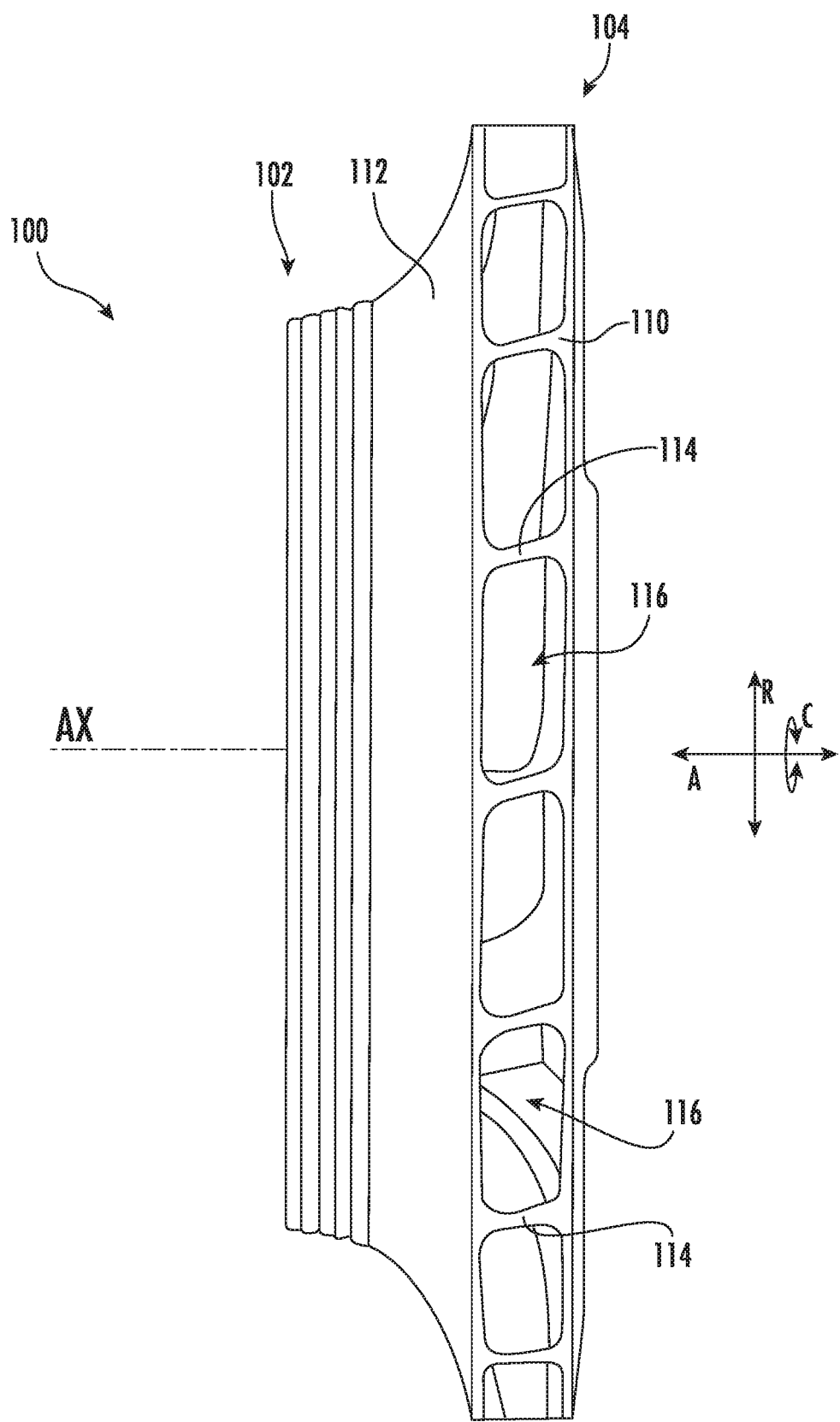
FIG. 4 provides a side view of the shrouded impeller of FIG. 3.
Figure 5:
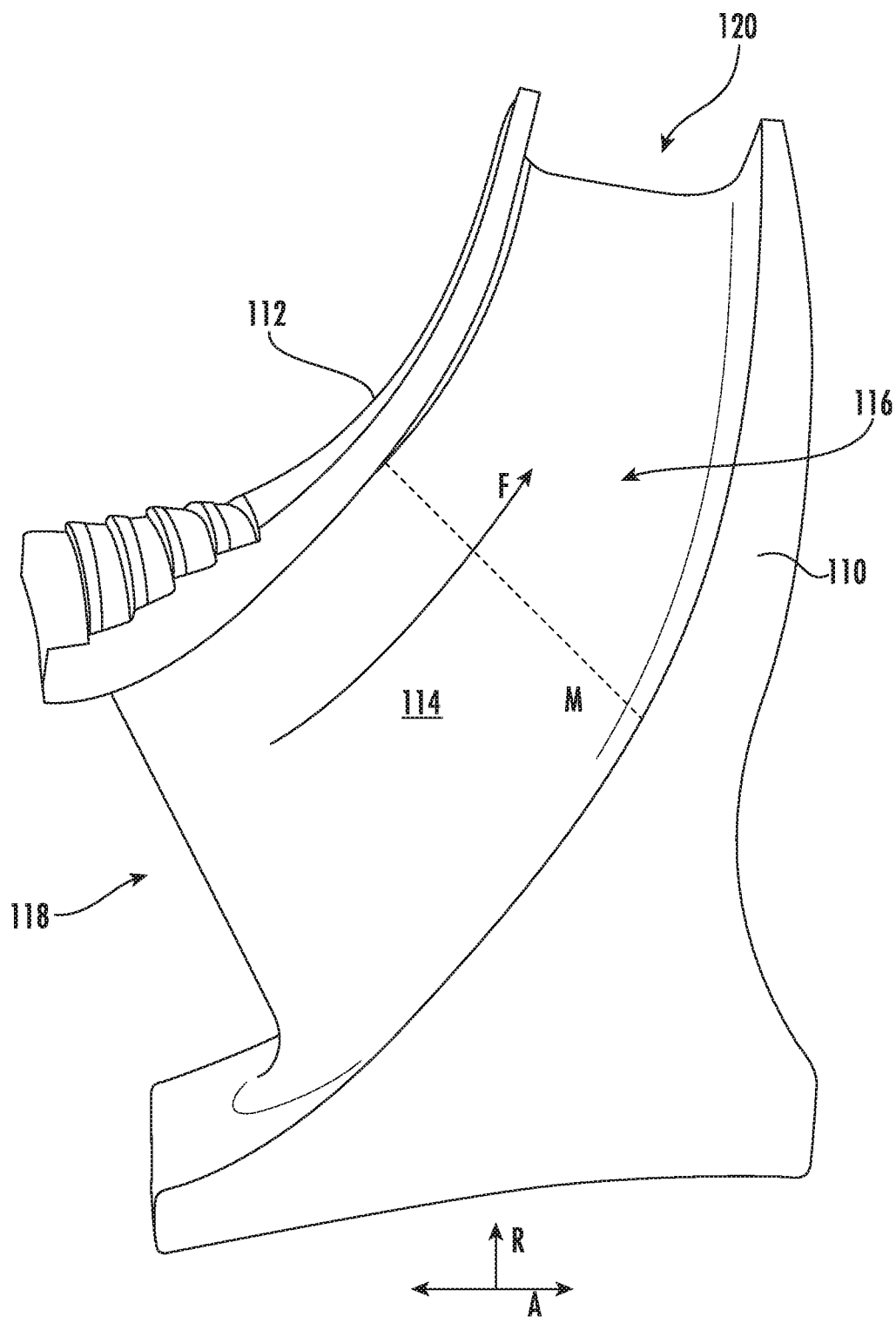
FIG. 5 provides a cross-sectional view of the shrouded impeller taken along line 5-5 of FIG. 3.

FIGS. 3, 4, and 5 provide views of an exemplary shrouded impeller 100 in accordance with exemplary embodiments of the present disclosure. In particular, FIG. 3 provides a perspective view of the shrouded impeller 100, FIG. 4 provides a side view of the shrouded impeller 100 of FIG. 3, and FIG. 5 provides a side cross-sectional view of the shrouded impeller 100 taken along line 5-5 of FIG. 3. The shrouded impeller 100 may be incorporated into any suitable application. For instance, the shrouded impeller 100 may be the impeller 30 of the gas turbine engine 10 of FIGS. 1 and 2.

As shown best in FIGS. 3 and 4, the shrouded impeller 100 defines an axial direction A, a radial direction R, and a circumferential direction C. In addition, the shrouded impeller 100 defines an axis of rotation AX. In general, the axial direction A extends parallel to the axis of rotation AX, the radial direction R extends orthogonally to or from the axis of rotation AX, and the circumferential direction C extends concentrically around the axis of rotation AX. In some embodiments, the axis of rotation AX of the shrouded impeller 100 is coaxial with the longitudinal axis 12 of the gas turbine engine 10 (FIG. 1) when the shrouded impeller 100 is mounted therein. The shrouded impeller 100 extends between a first end 102 and a second end 104, e.g., along the axial direction A (FIG. 4). Generally, the first end 102 is positioned upstream of the second end 104. Thus, the first end 102 defines a leading edge and the second end 104 defines a trailing edge of the shrouded impeller 100.

As shown best in FIG. 5, similar to the impeller of FIG. 2, the shrouded impeller 100 includes a hub 110, a shroud 112 spaced from the hub 110, and a plurality of blades or vanes 114 extending between and connecting the hub 110 and the shroud 112 (only one vane is shown in FIG. 5; multiple vanes 114 are shown in FIGS. 3 and 4). The vanes 114 are spaced apart from one another along the circumferential direction C. The vanes 114 each extend a relatively short distance along the axial direction A and transition to the radial direction R with a high radial vane twist. The shroud 112 generally encloses the vanes 114.

A flow passage 116 is defined between adjacent vanes 114 (only one flow passage 116 is shown in FIG. 5; multiple flow passages 116 are shown in FIGS. 3 and 4). The hub 110 and shroud 112 also define each flow passage 116. Each flow passage 116 extends between an inlet 118 and an outlet 120 (FIG. 5). For each flow passage 116, the inlet 118 is positioned upstream of the outlet 120. Thus, fluid F flows from the inlet 118 to the outlet 120 of each flow passage 116. Moreover, for this embodiment, the inlets 118 of the flow passages 116 are oriented along the axial direction A and the outlets 120 are oriented along the radial direction R. At the inlets 118 of the flow passages 116 or upstream portion of the shrouded impeller 100, the shroud 112 is spaced radially outward of the hub 110. At the outlets 120 of the flow passages 116 or downstream portion of the shrouded impeller 100, the shroud 112 is spaced from the hub 110 along the axial direction A.

Figure 6:
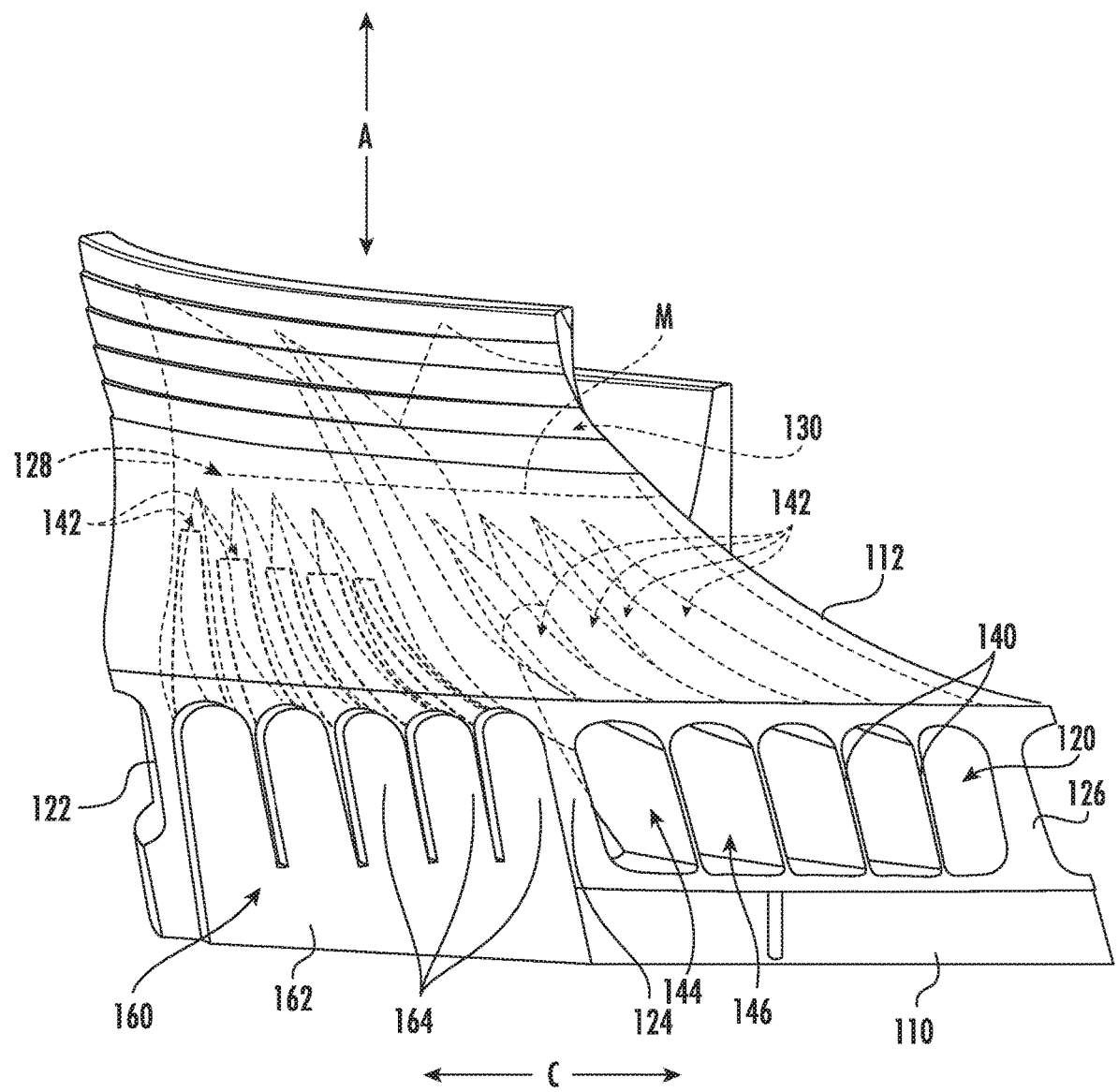
FIG. 6 provides a perspective view of a section of one exemplary embodiment of a shrouded impeller in accordance with exemplary embodiments of the present disclosure.

FIG. 6 provides a perspective view of a section of one exemplary embodiment of shrouded impeller 100. The section of the shrouded impeller 100 depicted in FIG. 6 includes three (3) of the plurality of vanes 114, including a first vane 122, a second vane 124, and a third vane 126. The first vane 122, the second vane 124, and the third vane 126 are spaced apart from one another along the circumferential direction C. Each vane 122, 124, 126 extends between and connects the hub 110 and the shroud 112. For this embodiment, a first flow passage 128 is defined by the first vane 122, the second vane 124, the hub 110, and the shroud 112. A second flow passage 130 is defined by the second vane 124, the third vane 126, the hub 110, and the shroud 112. As noted previously, the flow passages 116 extend between their respective inlets 118 and outlets 120 (FIG. 5).

As further depicted in FIG. 6, in some embodiments, the shrouded impeller 100 includes a plurality of spacer vanes 140 that extend between and connect the hub 110 and the shroud 112. Further, the spacer vanes 140 are positioned within the flow passages 116 between adjacent vanes. In particular, for this embodiment, four (4) spacer vanes 140 are positioned between the first vane 122 and the second vane 124 and four (4) spacer vanes 140 are positioned between the second vane 124 and the third vane 126. Like the vanes 122, 124, 126, the spacer vanes 140 are spaced from one another along the circumferential direction C. In some embodiments, the spacer vanes 140 are evenly spaced from one another along the circumferential direction C. The spacer vanes 140 extend along at least a portion of their respective flow passages 116. For this embodiment, a reference plane M is defined midway between the inlet 118 and the outlet 120 of each flow passage 116 (see also FIG. 5) and the spacer vanes 140 extend from the outlet 120 to a position downstream of the reference plane M. Thus, in some embodiments, the spacer vanes 140 do not extend the entire length of their respective flow passages 116.

Further, as shown in FIG. 6, each spacer vane 140 at least partially defines a sub passage 142. Some of the sub passages 142 of the flow passages 116 are defined by one of the vanes, one of the spacer vanes 140, the hub 110, and the shroud 112. For instance, a first sub passage 144 is defined by the second vane 124, the hub 110, the shroud 112, and one of the spacer vanes 140. Moreover, some of the sub passages 142 are defined between adjacent spacer vanes 140, the hub 110, and the shroud 112. For instance, a second sub passage 146 is defined between adjacent spacer vanes 140, the hub 110, and the shroud 112. For the first flow passage 128, five (5) sub passages 142 are defined. Likewise, for the second flow passage 130, five (5) sub passages 142 are defined. The spacer vanes 140 provide a number of benefits. For instance, the spacer vanes 140 may facilitate the flow of fluid through the outlets 120 of the flow passages 116 and also provide structures that may assist in the manufacture of the shrouded impeller 100 as will be explained herein.

Although the construction and method of making the shrouded impeller 100 are described generally herein, it should be appreciated that shrouded impeller 100 can be configured for use in any suitable application and in any suitable industry. For example, the concepts described herein could be used in power generation, aviation, maritime, and other industries to assist in compressing fluids. Moreover, FIGS. 3 through 6 illustrate an exemplary embodiment of the shrouded impeller 100 for the purpose of explaining its general operation, but the size, shape, and configuration, however, the exemplary depiction of the shrouded impeller 100 is not intended to limit the scope of the present disclosure.

In accordance with aspects of the present disclosure, some or all of shrouded impeller 100 may be formed using an additive manufacturing process, such as a 3-D printing process. The use of such a process may allow shrouded impeller 100 to be formed integrally, as a single monolithic component, or as any suitable number of sub-components. In particular, the manufacturing process may allow the shrouded impeller 100 to be integrally formed and include a variety of features not possible when using prior manufacturing methods. For example, the additive manufacturing methods described herein enable the manufacture of impellers having unique features, configurations, thicknesses, materials, densities, and structures not possible using prior manufacturing methods.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present disclosure. For example, although the discussion herein refers to the addition of material to form successive layers, one skilled in the art will appreciate that the methods and structures disclosed herein may be practiced with any additive manufacturing technique or manufacturing technology. For instance, embodiments of the present disclosure may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present disclosure, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Further, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and features that allow for relative motion between sub-components. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved functionality and reliability.

Figure 7:
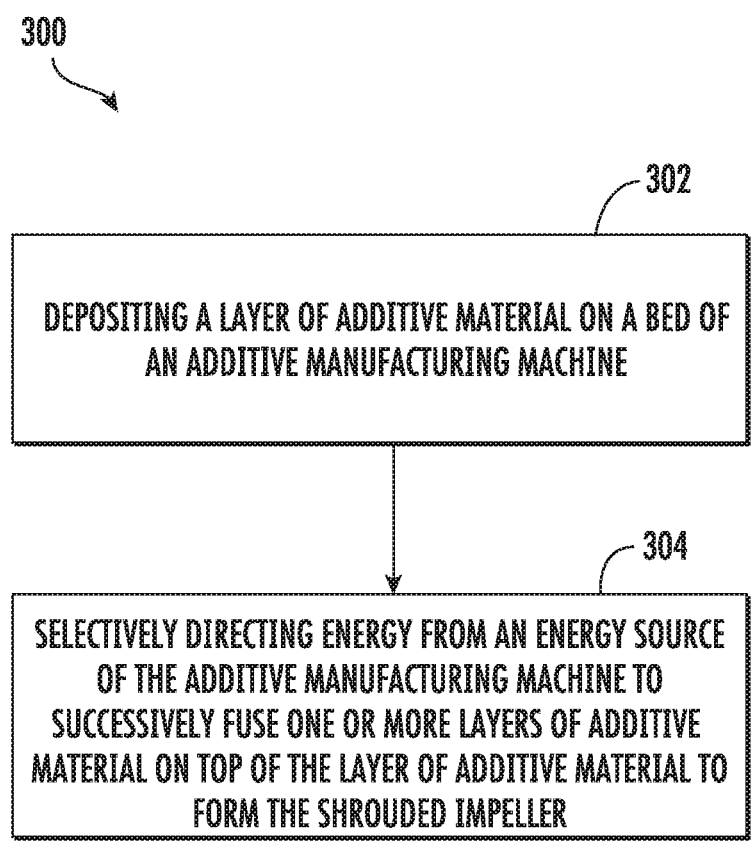
FIG. 7 provides a flow diagram for an exemplary method in accordance with exemplary embodiments of the present disclosure.

FIG. 7 provides a flow diagram of an exemplary method (300) for manufacturing a shrouded impeller in accordance with exemplary embodiments of the present disclosure. For instance, the exemplary method (300) may be utilized to additively manufacture the shrouded impeller 100 described above using one or more of the additive manufacturing techniques described above. Method (300) can be used by to form the shrouded impeller 100 or any other suitable component having an internal volume defined at least in part by an unsupported wall (i.e., a wall that is not supported during the additive printing process). It should be appreciated that the exemplary method (300) is discussed herein only to describe exemplary aspects of the present subject matter, and is not intended to be limiting.

Figure 8:
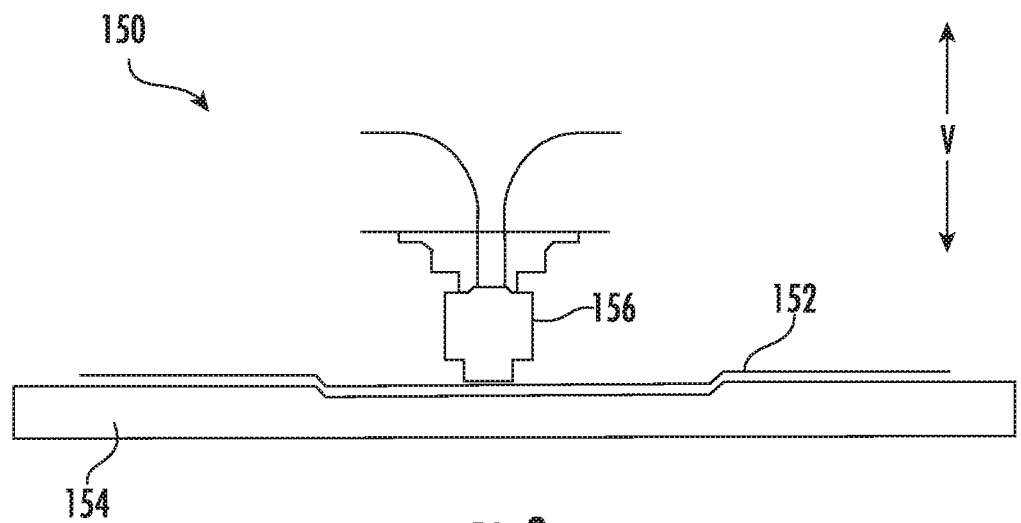
FIG. 8 provides an exemplary shrouded impeller in the process of being additively manufactured in a flat orientation in accordance with exemplary embodiments of the present disclosure.

At (302), the method (300) includes depositing a layer of additive material on a bed of an additive manufacturing machine. For instance, FIG. 8 depicts an exemplary additive manufacturing machine 150 depositing a layer of additive material 152 on a bed 154 or platform. The layer of additive material 152 may be formed of any suitable material, such as e.g., metal, some other material noted herein, or a combination thereof.

At (304), the method (300) includes selectively directing energy from an energy source of the additive manufacturing machine to successively fuse one or more layers of additive material on top of the layer of additive material to form the shrouded impeller. For instance, FIG. 9 depicts exemplary shrouded impeller 100 that has been built up by selectively directing energy from an energy source 156 of the additive manufacturing machine 150 to successively fuse one or more layers of additive material on top of the layer of additive material 152.

The shrouded impeller may be formed or built up similar in some or all respects to the shrouded impeller 100 described above. For instance, in some implementations, the shrouded impeller formed by method (300) includes a hub and a shroud spaced from the hub. The shrouded impeller also includes a plurality of vanes extending between and connecting the hub and the shroud. A flow passage extending between an inlet and an outlet is defined between adjacent vanes of the plurality of vanes and the shroud and the hub. Moreover, in some implementations, the shrouded impeller further includes a spacer vane extending between and connecting the hub and the shroud and positioned within the flow passage between adjacent vanes of the plurality of the vanes. The spacer vane extends along at least a portion of the flow passage and at least partially defines a sub passage. The sub passage is also defined in part by the hub and the shroud. In yet some further implementations, the spacer vane is one of a plurality of spacer vanes that each extend between and connect the hub and the shroud and are positioned within the flow passage between adjacent vanes of the plurality of the vanes. The spacer vanes are circumferentially spaced from one another. Each of the spacer vanes extend along at least a portion of the flow passage and at least partially defines a sub passage. The sub passages are also defined in part by the hub and the shroud.

Notably, during selectively directing energy from an energy source to successively fuse layers of additive material on top of the layer of additive material to form the shrouded impeller at (304), a support structure is formed within at least one of the sub passages. In some implementations, the support structure is simultaneously additively manufactured with shrouded impeller using one or more of the additive manufacturing techniques described above. The support structure is removable therefrom, e.g., after the shrouded impeller is additively formed. That is, the support structure may be removed from the sub passage.

Figure 9:
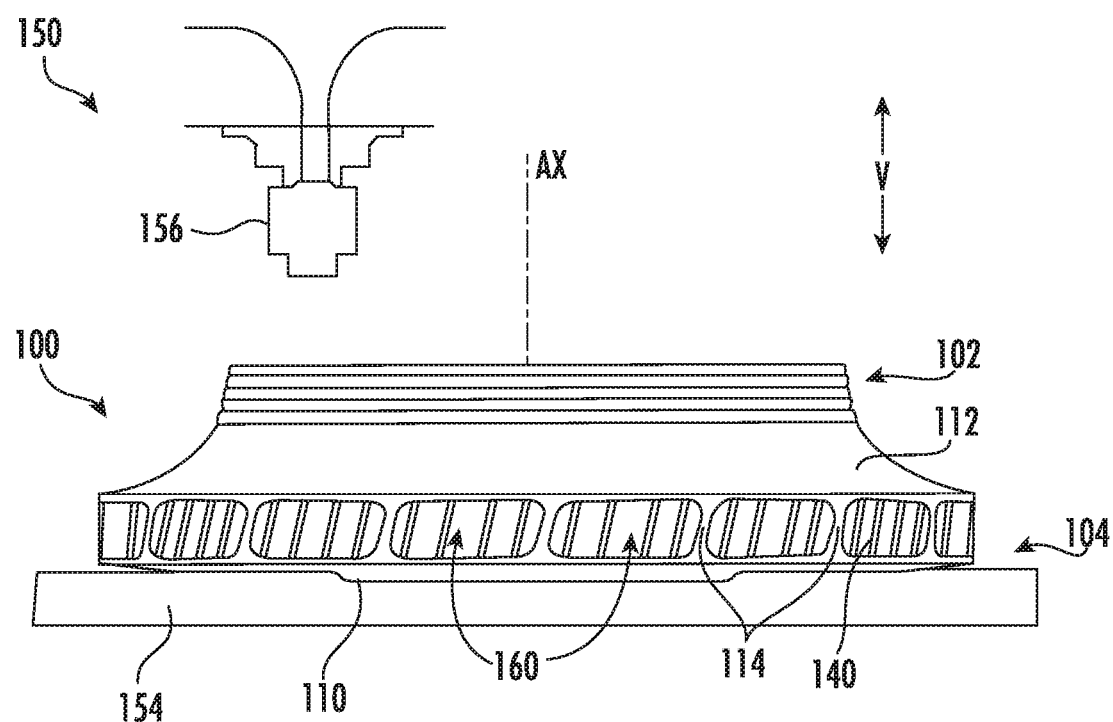
FIG. 9 provides an exemplary additively manufactured shrouded impeller in accordance with exemplary embodiments of the present disclosure.

As shown best in FIG. 9, if the shrouded impeller 100 is built up in a direction orthogonal to the bed 154, certain portions of the shrouded impeller 100 would be unsupported absent support structures 160 formed within the sub passages 142 during printing. Particularly, the shroud 112 would be unsupported absent support structures 160. Thus, advantageously, in some implementations, as the support structures 160 adequately support the shroud 112 during implementation of method (300), the shrouded impeller 100 may be built up or formed lying flat on the platform or bed 154 of the additive manufacturing machine 150. As shown in FIG. 9, the additive manufacturing machine 150 defines a vertical direction V. During directing energy from the energy source to successively fuse the layers of additive material on top of the layer of additive material to form the shrouded impeller, the axis of rotation extends substantially along the vertical direction. For the depicted implementation of FIG. 9, the axis of rotation AX extends along the vertical direction V. Accordingly, shrouded impeller 100 may be printed without need to angle the shrouded impeller 100 with respect to the flat bed 154 (i.e., a bed oriented orthogonal to the vertical direction V). Further, as the shrouded impeller 100 is a axisymmetric component, the shrouded impeller 100 is built up in an axisymmetric manner.

Referring again to FIG. 6, one exemplary support structure 160 will be described in more detail. As depicted, the support structure 160 includes a base member 162 and a plurality of passage fillers 164 projecting therefrom. In some implementations, during printing of the shrouded impeller 100, the passage fillers 164 are formed in each of the sub passages 142. The passage fillers 164 are formed such that they are shaped substantially complementary to the sub passages 142 in which they are formed. In this way, the passage fillers 164 generally fill the voids of the sub passages 142. Notably, in some implementations, the plurality of passage fillers 164 are formed to fill substantially all of the sub passage 142 in which they are formed at the outlet 120 of the flow passage, e.g., 128, 130. The passage fillers 164 can be customized to substantially fill a flow passage 116 or sub passage 142 having any suitable geometry. Notably, the spacer vanes 140 are spaced between the vanes 122, 124 to limit the width, e.g., the circumferential width in this embodiment, of the passage fillers 164 of the support structure 160. The inventors of the present application have discovered that limiting the width of the passage fillers 164 of the support structure 160 supporting the shroud 112 (or other unsupported surfaces) may be advantageous in supporting the shroud 112 and may provide surface finish benefits. Accordingly, the support structure 160 is formed having the plurality of passage fillers 164 spaced from one another along the circumferential direction C.

In some implementations, to ease removal of the support structure 160 from the shrouded impeller 100, e.g., after printing, the support structure 160 is formed such that at least a portion of the support structure 160 extends outward from the outlet 120 of the flow passage 116. That is, during directing energy from the energy source to successively fuse the layers of additive material on top of the layer of additive material to form the shrouded impeller at (304), the support structure is formed such that at least a portion of the support structure extends outward from the outlet of the flow passage. For instance, as shown in FIG. 6, the passage fillers 164 and the base member 162 are formed such that they extend outward from the outlet 120 of the flow passage 128. More particularly, a portion of at least some of the passage fillers 164 and the base member 162 are formed such that they extend outward from their respective sub passages 142 of the flow passage 128. Thus, an operator may grab the outward extending passage fillers 164 and/or the base member 162 and readily remove the support structure 160 from the shrouded impeller 100.

Moreover, in some implementations of method (300), to further ease removal of the support structure 160 from the shrouded impeller 100, during directing energy from the energy source to successively fuse the layers of additive material on top of the layer of additive material to form the shrouded impeller at (304), the support structure is formed as a ghost structure. That is, the support structure 160 formed as the ghost structure is not attached or connected to the shrouded impeller 100. Accordingly, in such implementations, the shrouded impeller 100 and the support structure 160 are simultaneously additively manufactured as distinct, separable monolithic components.

In yet other implementations, in manufacturing the shrouded impeller using method (300), the shrouded impeller is formed of a first material and the support structure is formed of the first material. That is, the shrouded impeller and the support structure are formed of the same material. For instance, in some exemplary implementations, the first material is metal. In alternative implementations, the shrouded impeller and the support structure are not formed of the same material. However, in such implementations, the support structure is formed of a material capable of supporting the weight of an unsupported wall during printing.

Figure 10:
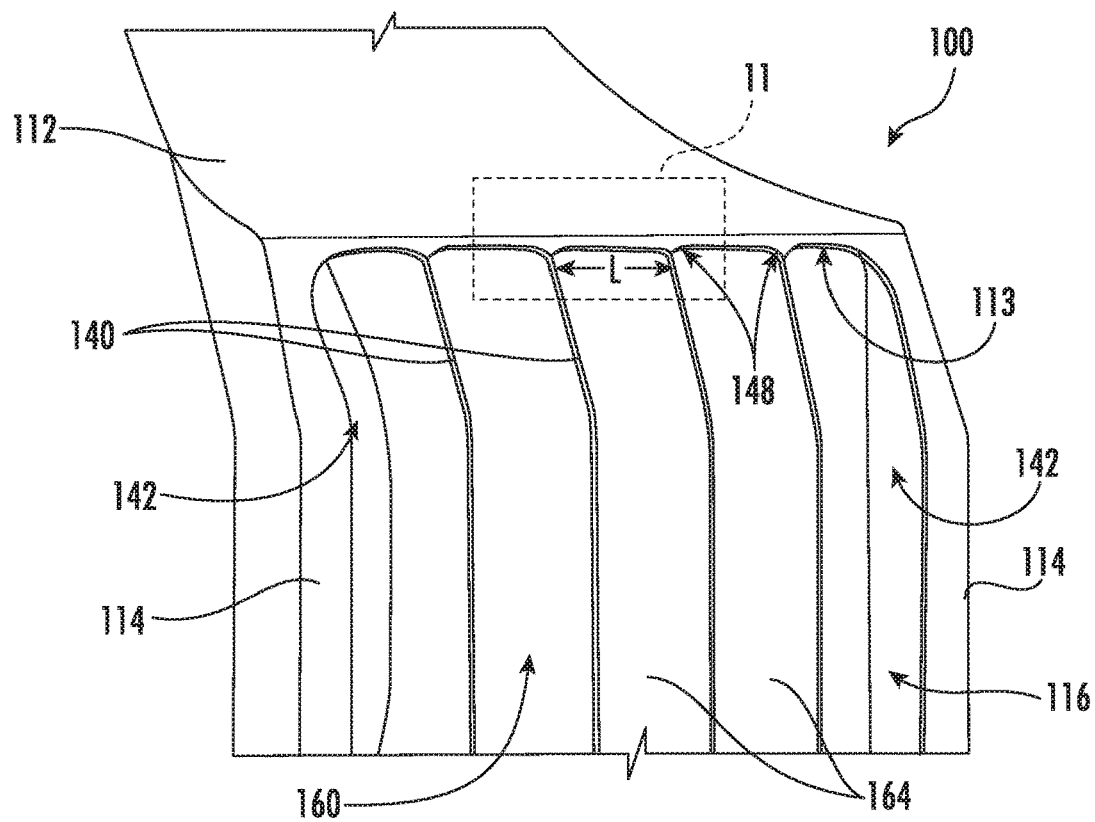
FIG. 10 provides a perspective view of a section of one exemplary embodiment of a shrouded impeller in accordance with exemplary embodiments of the present disclosure.

As shown in FIG. 10, in some implementations, the shroud 112 has an inner surface 113 that at least partially defines the various sub passages 142 of the shrouded impeller 100. The inner surface 113 of the shroud 112 has a length L extending between adjacent spacer vanes 140. Notably, the inner surface 113 is substantially straight along substantially all of the length L of the inner surface 113 between at least some of the adjacent spacer vanes 140. For instance, in some implementations, the inner surface 113 is substantially straight along substantially all of the length L of the inner surface 113 between at least some of the adjacent spacer vanes 140 if the inner surface 113 is substantially straight along at least ninety percent (90%) of the length L. By printing the shrouded impeller 100 and the support structures 160 in the same print, the shroud 112 is supported, and thus, certain geometries that provide some support of the shroud 112 even when unsupported by support structures 160, e.g., arches as shown in FIG. 6, are not required for support of the shroud 112 during printing. Accordingly, the geometry of the inner surface 113 of the shroud 112 may be relatively flat, which may ultimately allow for a more open sub passage 142 or flow passage 116. Consequently, the fillet radii 148 connecting the spacer vanes 140 with the inner surface 113 of the shroud 112 may be sized as needed for mechanical durability and not necessarily for supporting the shroud 112 during printing.

Further, in some implementations, as the shroud 112 is supported by the support structures 160 during printing, the shroud 112 may be formed of a relatively thin wall, allowing for more open sub passages 142, or more generally, more open flow passages 116. This may facilitate improved mass flow through the shrouded impeller 100 and improved performance of the turbomachinery in which the shrouded impeller 100 is mounted, such as e.g., the gas turbine engine 10 of FIG. 1. Also, the weight of the shrouded impeller 100 may be reduced.

Figure 11:
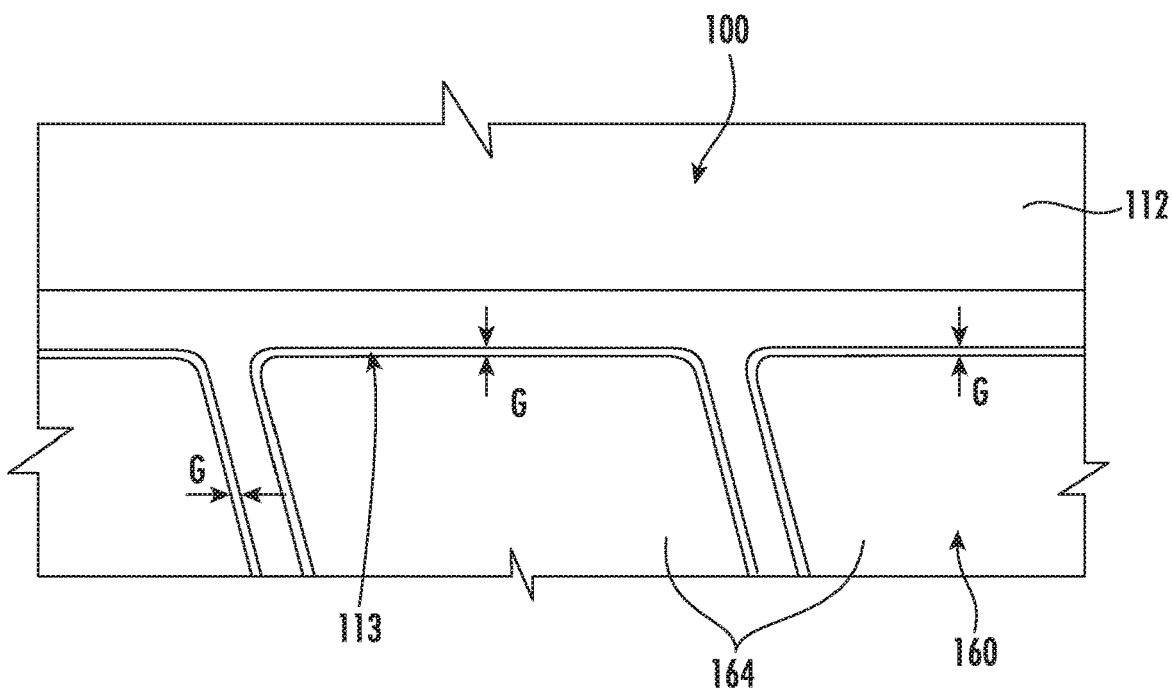
FIG. 11 provides a view of Section 10 of FIG. 11.

Moreover, in some implementations, as shown in FIG. 11, the support structure 160 is formed such that an offset or preselected gap G is defined between the support structure 160 and the shrouded impeller 100. The gap G may be filled with a powder or may be left as an air gap during printing. In some implementations, the gap G is between about 0.005 and 0.010 of an inch. In some implementations, the gap G is about 0.007 of an inch. The gap G or offset may be varied to improve the surface finish of the shrouded impeller 100 along certain surfaces. Generally the smaller the gap G or offset, the finer or smoother the surface finish of the shrouded impeller 100.

In one example implementation, the support structure 160 is formed of a first material and the shrouded impeller 100 is likewise formed of the first material, which in this example implementation is metal. The gap G between the support structure 160 and the shrouded impeller 100 is filled with a powder material and is about 0.007 inches wide. During printing, as the shrouded impeller 100 and the support structures 160 are additively manufactured (e.g., "printed") simultaneously layer-by-layer along the vertical direction V, when the shroud 112 is to be printed to enclose the sub passages 142, additive material may be deposited on the powered material forming the gap G between the support structure 160 and the shroud 112 to be printed. Thus, the shroud 112 is supported during printing, which may provide a quality finished printed component and may allow for the shrouded impeller 100 to be printed axisymmetric and orthogonal to bed 154 (FIG. 9).

Figure 12:
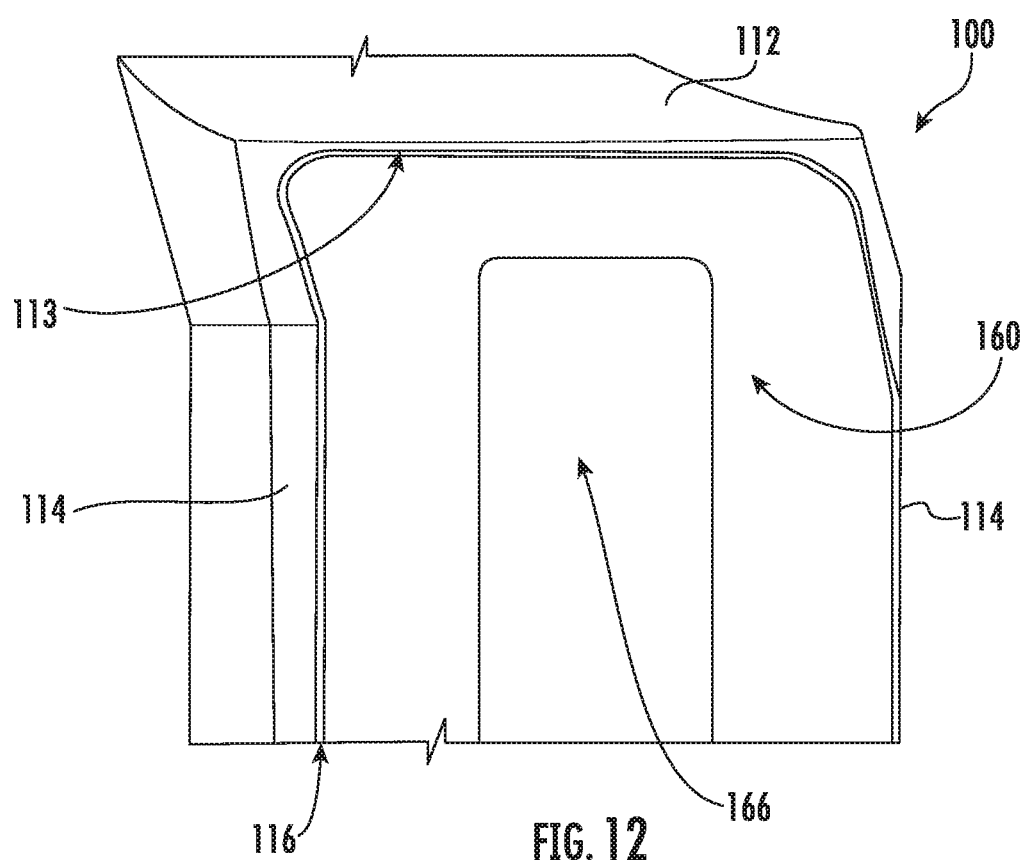
FIG. 12 provides a perspective view of a section of another exemplary embodiment of a shrouded impeller in accordance with exemplary embodiments of the present disclosure.

Additionally, in some implementations of method (300), the support structures 160 printed within the flow passages 116 need not substantially fill the entire flow passage 116. For example, as shown in FIG. 12, the support structure 160 does not substantially fill the flow passage 116. Moreover, as shown in FIG. 12, in some implementations, the shrouded impeller 100 need not include spacer vanes between the vanes 114. Rather, for the depicted embodiment, the support structure 60 spans the circumferential width between adjacent vanes 114. That is, the shroud 112 is formed having an inner surface 113 and the support structure 160 is formed such that the support structure 160 spans between adjacent vanes 114 of the plurality of vanes 114 along the inner surface 113 of the shroud 112, e.g., to support the shroud 112 during printing.

Further, the support structure 160 need not be solid block of printed material. Indeed, as shown in FIG. 12, the support structure 160 may be built up or printed in such a way so as to define one or more voids 166. That is, the support structure 160 is formed during printing such that the support structure defines one or more voids 166. Printing the support structure with one or more voids 166 may reduce material costs while still providing a support structure to support the shroud 112 during printing.

An additively manufactured shrouded impeller and a method for manufacturing that shrouded impeller are described above. In accordance with exemplary aspects of the present disclosure, additive support structures are printed within internal passages of the shrouded impeller to support various surfaces, such as e.g., the shroud of the shrouded impeller at the trailing edge outlets of the flow passages. By supporting these surfaces, the shrouded impeller can be built up lying flat on a platform or bed and in an axisymmetric manner. Such an orientation reduces complexity of the print, the build height, and the necessity to support the impeller at an angle, among other benefits. Further, aerodynamic features, e.g., the spacer vanes, may be printed between adjacent vanes. Such features facilitate mass flow through the impeller and also assist with the formation of the support structures and support of the shroud during printing. The support structures are readily removable from the shrouded impeller.

Figure 13:
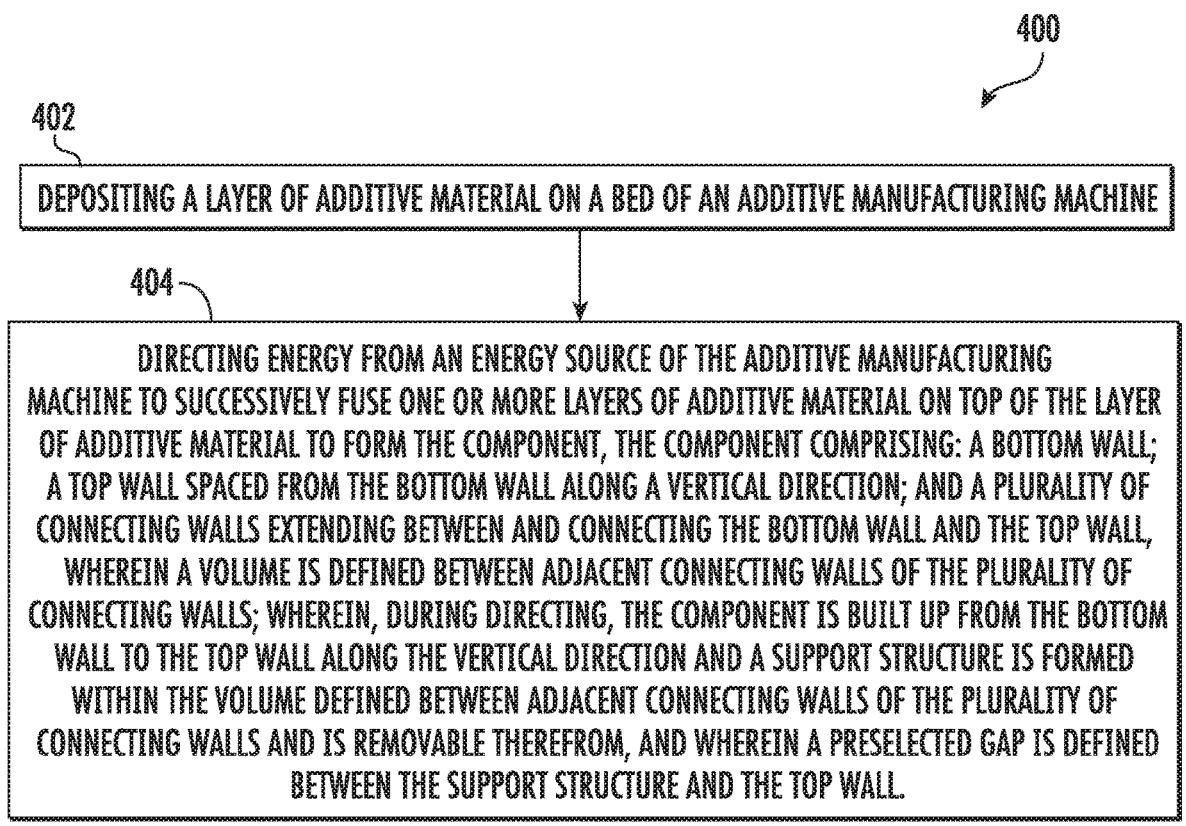
FIG. 13 provides a flow diagram for another exemplary method in accordance with exemplary embodiments of the present disclosure.

FIG. 13 provides a flow diagram of an exemplary method (400) for manufacturing a component of a turbomachine in accordance with exemplary embodiments of the present disclosure. For instance, the exemplary method (400) may be utilized to additively manufacture the shrouded impeller 100 described above using one or more of the additive manufacturing techniques described above. Method (400) can be used by to form the shrouded impeller 100 or any other suitable component of a turbomachine. It should be appreciated that the exemplary method (400) is discussed herein only to describe exemplary aspects of the present subject matter, and is not intended to be limiting.

At (402), the method (400) includes depositing a layer of additive material on a bed of an additive manufacturing machine.

At (404), the method (400) includes directing energy from an energy source of the additive manufacturing machine to successively fuse one or more layers of additive material on top of the layer of additive material to form the component. The formed component includes a bottom wall and a top wall spaced from the bottom wall along a vertical direction. For instance, where the component is the shrouded impeller 100 described herein, the bottom wall may be the hub 110 and the top wall may be the shroud 112. The formed component also includes a plurality of connecting walls extending between and connecting the bottom wall and the top wall, wherein a volume is defined between adjacent connecting walls of the plurality of connecting walls. For instance, where the component is the shrouded impeller 100 described herein, the connecting walls may be the vanes 114, for example. The volume may be one of the flow passages 116.

Further, in such implementations, during directing at (404), the component is built up from the bottom wall to the top wall along the vertical direction and a support structure is formed within the volume defined between adjacent connecting walls of the plurality of connecting walls and is removable therefrom. For instance, as shown best in FIG. 9, a component (e.g., the shrouded impeller 100) may be built up from the bottom wall (e.g., the hub 110) to the top wall (e.g., the shroud 112) along the vertical direction V. Moreover, as shown in FIG. 9, a support structure (e.g., support structure 160) is formed within the volume (e.g., flow passage 116; not labeled in FIG. 9) defined between adjacent connecting walls of the plurality of connecting walls (e.g., vanes 114) and is removable therefrom. In addition, in such implementations, during directing at (404), the component is built up such that a preselected gap is defined between the support structure and the top wall. For instance, as shown in FIG. 11, a gap G is defined between the support structure 160 and the top wall (e.g., the shroud 112). The gap G may be filled with a powder or may be left as an air gap during printing. In some implementations, the gap G is between about 0.005 and 0.010 of an inch. In some implementations, the gap G is about 0.007 of an inch. The gap G or offset may be varied to improve the surface finish of the shrouded impeller 100 along certain surfaces. Generally the smaller the gap G or offset, the finer or smoother the surface finish of the shrouded impeller 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a shrouded impeller, the method comprising:
   depositing a layer of additive material on a bed of an additive manufacturing machine; and directing energy from an energy source of the additive manufacturing machine to successively fuse one or more layers of additive material on top of the layer of additive material to form the shrouded impeller, the shrouded impeller comprising:
   a hub;
   a shroud spaced from the hub;
   a plurality of vanes extending between and connecting the hub and the shroud, wherein a flow passage extending between an inlet and an outlet is defined between adjacent vanes of the plurality of vanes; and
   a spacer vane extending between and connecting the hub and the shroud and positioned within the flow passage between adjacent vanes of the plurality of vanes, the spacer vane extending along at least a portion of the flow passage and at least partially defining a sub passage of the flow passage;
   wherein, during directing, a support structure is formed within the sub passage and is removable therefrom, and wherein the support structure has a passage filler that is formed within and shaped complementary to the sub passage.

2. The method of claim 1, wherein the spacer vane is one of a plurality of spacer vanes extending between and connecting the hub and the shroud and positioned within the flow passage between adjacent vanes of the plurality of vanes, the plurality of spacer vanes spaced from one another and each of the plurality of spacer vanes at least partially defining a sub passage.

3. The method of claim 2, wherein the passage filler is one of a plurality of passage fillers that are formed in each of the sub passages.

4. The method of claim 3, wherein the plurality of passage fillers are formed complementary to the sub passages in which they are formed.

5. The method of claim 4, wherein the plurality of passage fillers are formed to fill substantially all of the sub passage in which they are formed at the outlet of the flow passage.

6. The method of claim 3, wherein during directing energy from the energy source of the additive manufacturing machine to successively fuse the one or more layers of additive material on top of the layer of additive material to form the shrouded impeller, the support structure is formed with a base member from which the plurality of passage fillers project.

7. The method of claim 2, wherein the shroud has an inner surface that at least partially defines the sub passage, and wherein the spacer vane is one of a plurality of spacer vanes extending between and connecting the hub and the shroud and positioned within the flow passage between adjacent vanes of the plurality of vanes, and wherein the sub passage is defined between adjacent spacer vanes of the plurality of spacer vanes, and wherein the inner surface of the shroud has a length extending between the adjacent spacer vanes of the plurality of spacer vanes, and wherein the inner surface is substantially straight along substantially all of the length of the inner surface between the adjacent spacer vanes of the plurality of spacer vanes.

8. The method of claim 1, wherein a reference plane is defined midway between the inlet and the outlet of the flow passage, and wherein the spacer vane extends from the outlet of the flow passage to a position downstream of the reference plane, and wherein during directing energy from the energy source of the additive manufacturing machine to successively fuse the one or more layers of additive material on top of the layer of additive material to form the shrouded impeller, the support structure is formed within the sub passage at least partially defined by the spacer vane such that the support structure extends substantially along the sub passage.

9. The method of claim 1, wherein the additive manufacturing machine defines a vertical direction and the shrouded impeller defines an axis of rotation, and wherein during directing energy from the energy source of the additive manufacturing machine to successively fuse the one or more layers of additive material on top of the layer of additive material to form the shrouded impeller, the axis of rotation extends substantially along the vertical direction.

10. The method of claim 1, wherein during directing energy from the energy source of the additive manufacturing machine to successively fuse the one or more layers of additive material on top of the layer of additive material to form the shrouded impeller, the support structure is formed such that at least a portion of the support structure extends outward from the outlet of the flow passage.

11. The method of claim 1, wherein during directing energy from the energy source of the additive manufacturing machine to successively fuse the one or more layers of additive material on top of the layer of additive material to form the shrouded impeller, the support structure is formed as a ghost structure, wherein the ghost structure is not attached or connected to the shrouded impeller.

12. The method of claim 1, wherein during directing energy from the energy source of the additive manufacturing machine to successively fuse the one or more layers of additive material on top of the layer of additive material to form the shrouded impeller, the shrouded impeller is formed of a first material and the support structure is formed of the first material.

13. The method of claim 1, wherein the shrouded impeller and the support structure are simultaneously additively manufactured as distinct, separable monolithic components.

14. The method of claim 1, wherein during directing energy from the energy source of the additive manufacturing machine to successively fuse the one or more layers of additive material on top of the layer of additive material to form the shrouded impeller, the shroud is formed having an inner surface and the support structure is formed such that the support structure spans between adjacent vanes of the plurality of vanes along the inner surface of the shroud.

15. The method of claim 1, wherein during directing energy from the energy source of the additive manufacturing machine to successively fuse the one or more layers of additive material on top of the layer of additive material to form the shrouded impeller, the support structure is formed such that the support structure defines one or more voids.

16. A method for manufacturing a component of a turbomachine, the method comprising:
    depositing a layer of additive material on a bed of an additive manufacturing machine; and
    directing energy from an energy source of the additive manufacturing machine to successively fuse one or more layers of additive material on top of the layer of additive material to form the component, the component comprising:
    a bottom wall;
    a top wall spaced from the bottom wall along a vertical direction; and
    a plurality of connecting walls extending between and connecting the bottom wall and the top wall, wherein a volume is defined between adjacent connecting walls of the plurality of connecting walls;
    wherein, during directing, the component is built up from the bottom wall to the top wall along the vertical direction and a support structure having a passage filler is formed so that the passage filler is formed within and shaped complementary to the volume defined between adjacent connecting walls of the plurality of connecting walls and is removable therefrom, and wherein a preselected gap is defined between the support structure and the top wall.

* * * * *